Patented Oct. 18, 1949

2,485,524

UNITED STATES PATENT OFFICE 2,485,524

DEHYDROCHLORINATION OF CHLORETHYL POLYCHLOROBENZENES

Costas H. Basdekis, Springfield, Mass., assignor to Monsanto Chemical Company, St. Louis, Mo., a corporation of Delaware No Drawing. Application April 19, 1946, Serial No. 663,614

3 Claims. (Cl. 260—650)

This invention relates to the preparation of unsaturated hydrocarbons. More particularly, the invention relates to a catalyst for promoting the dehydrohalogenation of halogen-substituted aliphatic compounds or radicals.

An important method for the production of unsaturated compounds is dehydrohalogenation of saturated halogenated compounds. The process is greatly accelerated by the use of dehydrohalogenation catalysts and many materials have been suggested for use as catalysts. However, the known catalysts have the disadvantage that their activity is influenced by the residue of the halogenated aliphatic compound with the result that the halogen atom must be attached to a specific carbon atom to obtain optimum yields of unsaturated compounds. For example, most dehydrohalogenation catalysts are effective only for the production of styrene from alpha halogenated ethyl benzene. This necessitates the separation of beta halogenated ethyl benzene before dehydrohalogenation in order to obtain a substantially pure product.

One object of this invention is to produce unsaturated compounds from halogenated aliphatic compounds or radicals.

A further object of this invention is to provide a catalyst for the dehydrohalogenation of aliphatic compounds or radicals.

Another object is to provide a dehydrohalogenation catalyst which is effective regardless of the nature of the remainder of the organic compound.

A particular object of this invention is to provide a dehydrohalogenation catalyst for the production of aromatic vinyl compounds from sidechain halogenated aromatic compounds.

These and other objects are attained by using calcium sulfate as a dehydrohalogenation catalyst in the presence of a heated inert gas.

The following examples are given in illustration and are not intended to limit the scope of this invention.

Example I

A mixture of pure alpha chlorethyl-2,5-dichlorobenzene and steam superheated to about 450° C. was passed through a catalyst tube containing granular anhydrous calcium sulfate, at a rate of approximately 700 grams per hour. The catalyst temperature rose to about 400° C. at the start of the reaction and was maintained at that temperature for the duration of the reaction by the heat of the reaction mixture. The product obtained was substantially pure 2,5-dichlorostyrene.

Example I was repeated using beta chlor-ethyl-2,5-dichlorobenzene. Again nearly pure 2,5-dichlorostyrene was obtained. When a mixture of alpha and beta chlorethyl-2,5-dichlorobenzene was used, substantially the same results were obtained.

If a carbon catalyst is substituted for the calcium sulfate, only the alpha chlorethyl isomer is substantially dehydrochlorinated and the beta chlorethyl isomer is relatively unreacted.

Example II

A mixture of alpha and beta chlorethyl polychlorbenzenes obtained by ring chlorination of ethyl benzene followed by chlorination of the side chain was mixed with superheated steam and passed over calcium sulfate. A mixture of polychlorstyrenes was obtained, substantially free from the original starting compounds.

The calcium sulfate catalyst need not be anhydrous especially since, if steam is used, a small amount of water condenses in the catalyst tube at the start of the reaction unless the tube has been preheated. The catalyst becomes substantially anhydrous under the influence of the superheated steam soon after the temperature of the catalyst bed approaches that of the entering steam. A granular calcium sulfate was used to provide sufficient porosity in the catalyst bed to permit free flow of the reaction mixture through the catalyst.

The temperatures and reaction rates shown in the examples may be varied over wide ranges. The temperature may be as low as 300° C. and may be raised up to a point just below the decomposition temperature of the reactants. The optimum temperature is above about 375° C. for optimum conversion. The rate of flow through the catalyst may be substantially lower or higher than 700 grams per hour depending on the size and shape of the catalyst chamber, on the temperature and on the reactivity of the catalyst.

Example III

A mixture of isopropyl chloride and steam superheated to about 500° C. was passed through a catalyst tube containing granular calcium sulfate at a rate of approximately 700 grams per hour. Substantially pure propylene was obtained.

The superheated steam may be replaced by preheated inert gases such as nitrogen, carbon dioxide, etc. Their function is to act as a carrier for the saturated halogenated compound, to provide heat for the reaction and to exclude oxygen which interferes with the dehydrohalogenation reaction. The superheated steam functions as an inert gas in the processes of this invention.

The calcium sulfate catalyst gradually loses its reactivity as the reaction proceeds. In general, one batch of catalysts may be used from 18 to 25 hours after which it may be regenerated by passing through it a mixture of superheated steam and air. The regeneration cycle will depend on the amount of catalyst present, but normally will taken about two hours. The catalyst may also be regenerated by other means for removing carbon deposited on its surface, such as heating in air.

The calcium sulfate catalyst may be used to dehydrohalogenate other halogenated side-chain substituted aromatic compounds as well as halogenated aliphatic compounds, e. g., chlorethyl benzene, di(chlorethyl) benzene, chlorethyl-p-methyl benzene, ethyl chloride, propyl chloride, dichlorethane, or similar compounds in which the halogen substituent is fluorine, bromine or iodine.

Calcium sulfate has the particular advantage as a dehydrohalogenation catalyst that it promotes the dehydrohalogenation of saturated aromatic compounds regardless of the position of the halogen atom with respect to the rest of the molecule, except that there must be at least one hydrogen atom on a carbon atom adjacent to the carbon atom to which the halogen is attached. This property is exemplified by the action of calcium sulfate in accelerating the dehydrochlorination of a mixture of alpha and beta chlorethyl polychlorbenzenes. It is also outstanding in the very high yields of the desired unsaturated compounds, yields which approximate 100% of the theoretical.

It is obvious that variations may be made in the processes and products of this invention without departing from the spirit and scope thereof as defined in the appended claims.

What is claimed is:

1. A process for the dehydrochlorination of a mixture comprising alpha and beta chlorethyl polychlorobenzenes which comprises mixing the alpha and beta chlorethyl polychlorbenzene mixture with a heated inert gas and passing the mixture over calcium sulfate at a temperature of at least 300° C.

2. A process for the dehydrochlorination of alpha chlorethyl-2,5-dichlorobenzene which comprises mixing the alpha chlorethyl-2,5-dichlorobenzene with a heated inert gas and passing the mixture over calcium sulfate at a temperature of at least 300° C.

3. A process for the dehydrochlorination of beta chlorethyl-2,5-dichlorobenzene which comprises mixing the beta chlorethyl-2,5-dichlorobenzene with a heated inert gas and passing the mixture over calcium sulfate at a temperature of at least 300° C.

COSTAS H. BASDEKIS.

REFERENCES CITED

The following references are of record in the file of this patent:

UNITED STATES PATENTS

| Number | Name | Date |
|---|---|---|
| 2,363,011 | Michalek et al. | Nov. 21, 1944 |
| 2,432,737 | Erickson et al. | Dec. 16, 1947 |

OTHER REFERENCES

Gutner et al., "Jour. Gen. Chem." (U. S. S. R.), vol. 6, pages 1733–4 (1936).

Gluud et al., "Ber. der. deut. Chem. Gesell.," vol. 57B, pages 254–5 (1924).

Nagai, "Jour. Soc. Chem. Ind. Japan," vol. 44, pages 64–5 (1941).

Natelson, "Industrial and Engineering Chemistry," page 1392 (1933).